US012620284B2

(12) United States Patent
Stubbs et al.

(10) Patent No.: US 12,620,284 B2
(45) Date of Patent: May 5, 2026

(54) SYSTEM AND METHOD FOR DRONE DELIVERY

(71) Applicant: Deliviweed LLC, Indianapolis, IN (US)

(72) Inventors: Barrett Stubbs, Indianapolis, IN (US); David Risner, Indianapolis, IN (US)

(73) Assignee: Deliviweed LLC, Indianapolis, IN (US)

( * ) Notice: Subject to any disclaimer, the term of this patent is extended or adjusted under 35 U.S.C. 154(b) by 63 days.

(21) Appl. No.: 18/657,404

(22) Filed: May 7, 2024

(65) Prior Publication Data

US 2024/0378931 A1     Nov. 14, 2024

Related U.S. Application Data

(60) Provisional application No. 63/464,790, filed on May 8, 2023.

(51) Int. Cl.
| | |
|---|---|
| *H04L 9/32* | (2006.01) |
| *G06Q 10/083* | (2023.01) |
| *G07C 9/00* | (2020.01) |
| *G07C 9/25* | (2020.01) |

(52) U.S. Cl.
CPC ....... *G07C 9/00563* (2013.01); *G06Q 10/083* (2013.01); *G07C 9/00309* (2013.01); *G07C 9/00571* (2013.01); *G07C 9/25* (2020.01); *H04L 9/3231* (2013.01); *G07C 2009/00412* (2013.01)

(58) Field of Classification Search
None
See application file for complete search history.

(56) References Cited

U.S. PATENT DOCUMENTS

| | | | |
|---|---|---|---|
| 9,523,986 B1 | 12/2016 | Abebe et al. | |
| 9,741,010 B1 | 8/2017 | Heinla | |
| 10,097,353 B1 * | 10/2018 | Carlson | H04L 67/306 |
| 10,370,103 B2 | 8/2019 | Hoareau et al. | |
| 10,414,344 B1 * | 9/2019 | Northcott | B60R 16/00 |
| 10,657,486 B1 | 5/2020 | Wolter et al. | |
| 11,127,305 B2 | 9/2021 | Di Benedetto et al. | |
| 11,238,679 B2 | 2/2022 | Shah et al. | |
| 11,305,875 B2 | 4/2022 | Chen et al. | |
| 11,396,273 B2 * | 7/2022 | Tazume | B60R 25/20 |
| 11,449,821 B2 | 9/2022 | Malhotra et al. | |
| 11,608,168 B2 | 3/2023 | Polus | |
| 2019/0049995 A1 * | 2/2019 | Ferguson | G07F 17/12 |
| 2019/0152401 A1 * | 5/2019 | Gargano | B60R 7/04 |
| 2020/0097863 A1 * | 3/2020 | Hiruta | G06Q 10/02 |
| 2020/0201345 A1 * | 6/2020 | Ferguson | B60W 60/00276 |
| 2021/0005035 A1 * | 1/2021 | Tsujimura | G06Q 10/08 |
| 2021/0019979 A1 * | 1/2021 | Mackenzie | G07F 9/006 |
| 2021/0029100 A1 * | 1/2021 | Bendersky | H04L 63/0876 |
| 2021/0339704 A1 * | 11/2021 | Rathi | B60R 25/20 |
| 2022/0019995 A1 * | 1/2022 | Ngo | G06Q 20/385 |
| 2022/0055770 A1 * | 2/2022 | O'Toole | B65G 69/003 |

(Continued)

*Primary Examiner* — Joshua Joo
(74) *Attorney, Agent, or Firm* — Woodard Emhardt Henry Reeves & Wagner LLP

(57) ABSTRACT

The present disclosure provides a unique system and method useful for secure delivery of products. The system includes a network, a control backend, an unmanned delivery device, at least one secure compartment, and a verification device. The system-implemented method includes two-stage biometric identifications as well as a Near Field Communication (NFC) enabled encrypted keys verifications to enhance security and privacy.

11 Claims, 6 Drawing Sheets

(56)  References Cited

U.S. PATENT DOCUMENTS

| | | | |
|---|---|---|---|
| 2022/0097651 A1* | 3/2022 | Oishi | G06F 21/32 |
| 2022/0118945 A1* | 4/2022 | Sakurada | B60R 25/241 |
| 2022/0206488 A1* | 6/2022 | Czinger | G05D 1/028 |
| 2022/0234489 A1* | 7/2022 | Tam | H04W 12/03 |
| 2023/0159058 A1* | 5/2023 | Polyakov | B60Q 1/549 |
| | | | 701/25 |
| 2023/0182989 A1* | 6/2023 | Grenmark | B65D 81/3897 |
| | | | 220/592.2 |
| 2024/0067197 A1* | 2/2024 | Yoshikawa | B60W 50/04 |
| 2024/0283302 A1* | 8/2024 | Masuda | H02J 50/80 |
| 2025/0037068 A1* | 1/2025 | Bennett | B60W 60/00256 |
| 2025/0074632 A1* | 3/2025 | DiCosola | G07F 15/006 |
| 2025/0078013 A1* | 3/2025 | Aggarwala | G06Q 10/06312 |
| 2025/0123624 A1* | 4/2025 | Shih | G05D 1/246 |

* cited by examiner

510

220

405

505

310

305

500

SYSTEM AND METHOD FOR DRONE DELIVERY

BACKGROUND

In the field of autonomous delivery, ensuring efficiency, safety, and security is paramount for meeting customer demands. Current autonomous delivery approaches include using a drone or an autonomous vehicle as the delivery platform. These delivery platforms typically have a compartment and/or a detachable string to carry goods. While these current approaches are able to deliver goods to designated delivery locations, they provide limited or no security scheme to the goods during transportation and delivery. Therefore, certain high-valued and/or controlled goods are not suitable for undergoing such delivery methods.

Thus, there remains a need for improved and/or alternative approaches to reinforce security in autonomous delivery systems. Aspects of the present disclosure are addressed to those needs.

SUMMARY

A unique system and method have been developed to address these as well as other issues. In one embodiment, the system includes a network, a control backend, an unmanned delivery device, and a verification device. Each component of the system is linked together by the network such that data can be communicated among the system components. The control backend is configured to process customer orders and coordinate deliveries of the customer orders. The unmanned delivery device is configured to deliver customer orders autonomously. The verification device facilitates a secure verification for a customer to access the goods.

According to one embodiment, the control backend includes a database and a processor. In accordance with some forms, the database is configured to store at least one biometric identifier of a customer. In certain embodiments, the database is configured to store one or more reference identifier which are linked to one or more biometric identifiers which are stored on a separate secure database. In some forms, the database is further configured to verify customer identity by comparing biometric identifiers of the customer. The processor may be configured to generate at least one public key and at least one private key. The public key is configured to be stored locally on the unmanned delivery device, and the private key is configured to be stored in the database and transmitted to the verification device.

In one version, the unmanned delivery device includes a network interface controller (NIC), a computer, a transportation portion, and a secure portion that has at least one secure compartment. The network interface controller is configured to enable the unmanned aerial vehicle to communicate with other system components such as the backend through the network. The computer includes at least a processor that processes algorithms including artificial intelligence (AI) algorithms for optimizing delivery routes and a memory that facilitates storing working data on the unmanned delivery device. The working data includes, but is not limited to, the public key generated from the backend processor and/or the biometric identifiers of the customers. The transportation portion is configured to carrying the unmanned delivery device to the site of delivery. The secure portion is coupled to the unmanned delivery device for storing products. The secure compartment is configured to provide access of the product to the customer who placed the order and obtained the private key by the verification device that matches the public key stored on the unmanned delivery device.

In one example, a customer orders an item. In some forms, ordering may be using an app or web browser on the verification device. Prior to or during the ordering process, the customer is required to provide a first biometric identifier, such as a facial scan. In certain embodiments, the first biometric identifier is transmitted to the database of the control backend. The database also receives the order information, which includes at least the product to be delivered and a delivery location designated by the customer. The processor of the backend processes the order and coordinates preparation of the delivery. Before loading the product into the unmanned delivery device, the processor assigns at least one secure compartment of the unmanned delivery device to the ordered product. During order processing and delivery preparation, the processor stores the first biometric identifier along with other information that has been input by the customer in the database and generates encryption keys: a public key stored on the unmanned delivery device and associated with the secure compartment assigned to the product, and a private key stored in the database and sent to the customer's verification device. Thereafter, the ordered product is securely loaded into the secure compartment of the unmanned delivery device, which is designed to be tamper-resistant.

In accordance with some forms, the unmanned delivery device is dispatched from a distribution center and navigates autonomously, optionally using GPS and/or AI to optimize the route, carrying the secure compartment with the ordered product secured therein to the delivery location. Upon arrival at the delivery location, the unmanned delivery device comes to a full stop at a predetermined spot. Around the same time, the customer receives a notification via the verification device that the order is ready for pickup. The customer approaches the unmanned delivery device and completes a second biometric scan. The second biometric identifier of the customer is then compared with the first biometric identifier. If the biometrics match, the verification device transmits the private key to be compared with the public key associated with the secure compartment of the unmanned delivery device. If the keys match, the secure compartment unlocks.

Other objects, embodiments, forms, features, advantages, aspects, and benefits of the present disclosure shall become apparent from the detailed description and drawings included herein.

DETAILED DESCRIPTION OF SELECTED EMBODIMENTS

Figure 1:
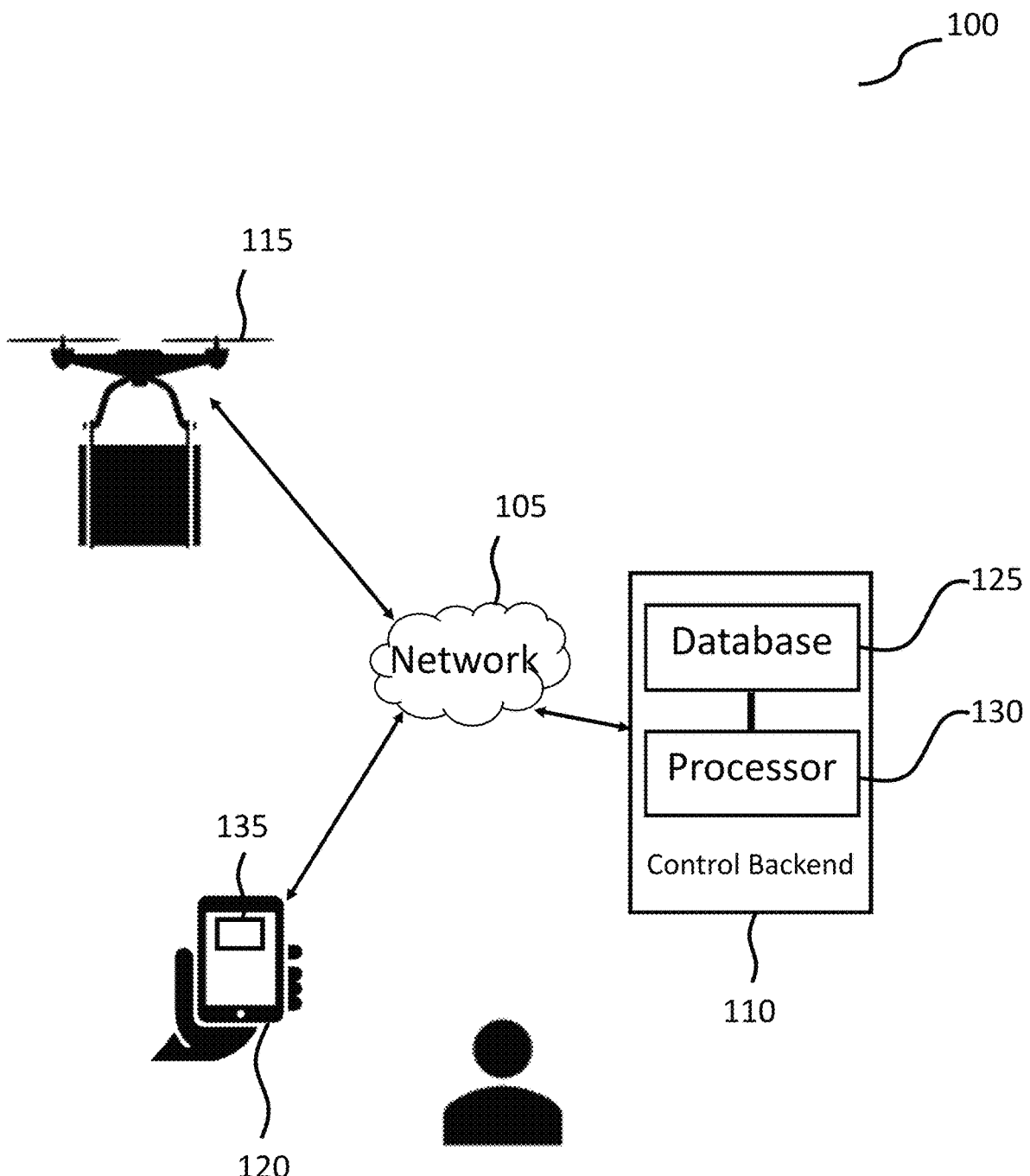
FIG. 1 is a block diagram of a secure delivery system according to one example.

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments and any further applications of the principles of the disclosure as described herein are contemplated as would normally occur to one skilled in the art to which the disclosure relates. One embodiment of the disclosure is shown in great detail, although it will be apparent to those skilled in the relevant art that some features that are not relevant to the present disclosure may not be shown for the sake of clarity.

As disclosed above, aspects of the present disclosure relate to a secure delivery system useful for securely delivering high-valued and/or controlled goods. Accordingly, in some aspects the present disclosure provides a delivery system and method for secure delivery of a parcel comprising a two-stage biometric identification process. In accordance with some forms, the user must also provide one or more status verification materials prior to order, such status verification materials indicate whether the user is able to order a specific material and may include, for example: a valid prescription, and/or a state issued identification.

FIG. 1 illustrates a secure delivery system 100 according to one embodiment of the present disclosure. As shown, the secure delivery system 100 comprises a network 105, a control backend 110, an unmanned delivery device 115, and a verification device 120. As should be appreciated, the secure delivery system 100 may include alternative and additional components, depending on the sizes and/or types of an operation that utilizes the secure delivery system 100. In the illustrated example, each component of the secure delivery system 100 is linked together by the network 105 such that data can be communicated among the components. Generally, the control backend 110 is configured to process customer orders and coordinate deliveries of the customer orders. In some forms, the unmanned delivery device 115 is configured to transport customer orders to designated locations autonomously. Secure delivery systems 100 may be configured for use with a semi-autonomous system, or a system which is completely or partially remotely controlled by a human user. In accordance with some forms, the delivery device may be transported partially by human guided means (e.g. loaded into a vehicle and transported prior to launch) and then launched to complete the delivery. In accordance with some forms, the verification device 120 is configured to facilitate secured verifications for the customer to access the ordered product.

In the illustrated embodiment, the control backend 110 includes a database 125 and a processor 130. As should be appreciated, the control backend 110 may include other parts such as an interface and/or a NIC. In one form, the database 125 is configured to store biometric identifiers of customers. In another form, the database 125 is further configured to verify customer identity by comparing at least two sets of biometric identifiers of a customer. The processor 130 is configured to generate encrypted keys such as a pair of public key and private key. In one example, the public key is configured to be stored locally on the unmanned delivery device 115, and the private key is configured to be stored in the database 125 at the control backend 110 and transmitted to the verification device 120 of the customer. It is within the scope of the disclosure to provide a control backend wherein the database and processor are present at a single location, or alternatively the database and processor may be present at separate locations and joined via a network connection.

According to one example, the verification device 120 includes a smart phone. As should be appreciated, the verification device 120 may comprise any device suitable for verification of a user's identity. In some forms, the verification device comprises a smart wearable device such as a smart watch, smart glasses, and/or a smart ring. In certain embodiments, the verification device comprises a person computer, kiosk, or tablet. In general, the verification device 120 is configured to allow for seamless and secure communication, for instance, between the verification device 120 and the unmanned delivery device 115, and/or between the verification device 120 and the control backend 110. In the illustrated example, the verification device 120 is equipped with Near Field Communication (NFC) technology to facilitate the secure communication without requiring a secure element such as a microprocessor chip, increasing the flexibility and ease of use of the secure delivery system 100. In one form, the verification device 120 further includes a biometric scanner 135 configured to scan and obtain one or more biometric identifiers. In accordance with some forms, the biometric identifiers comprise facial identification, retina identification, and/or fingerprint identification.

Figure 2:
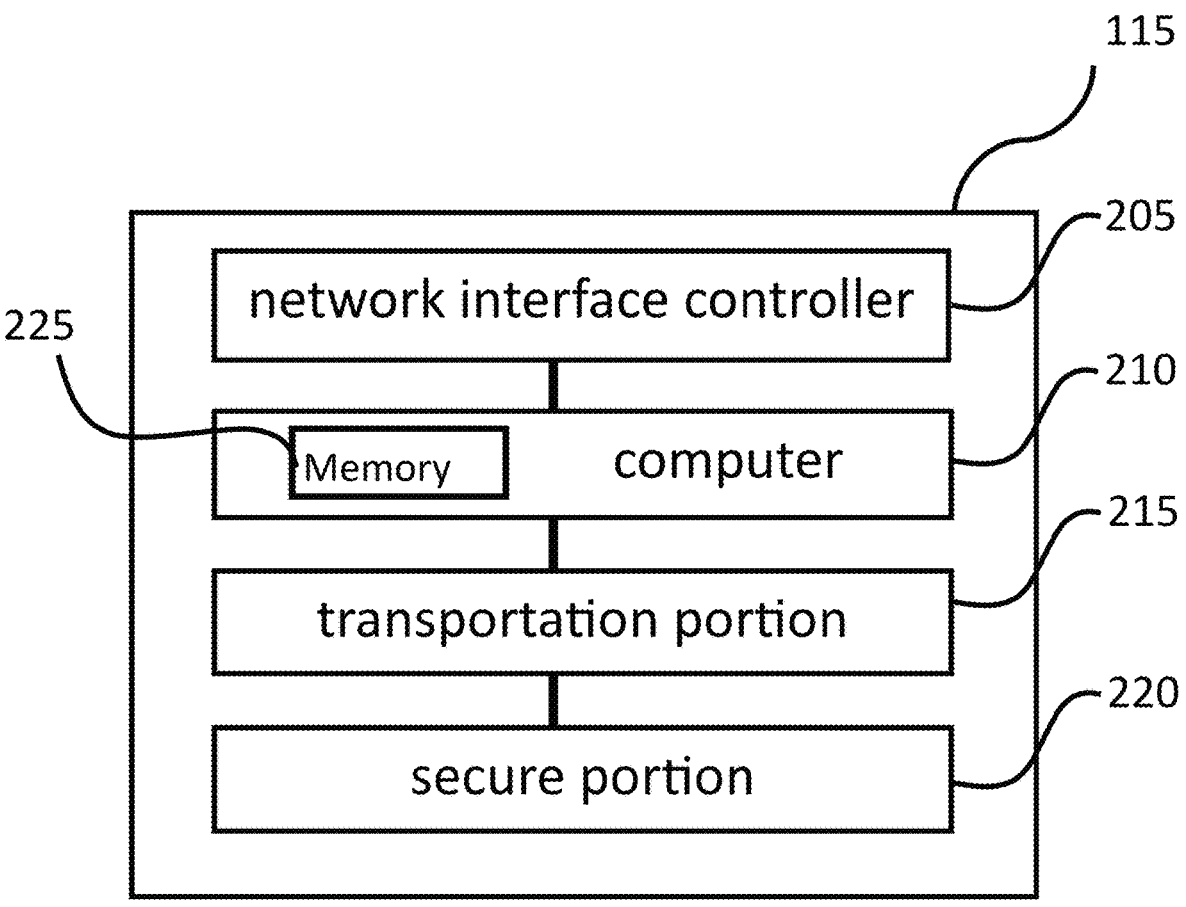
FIG. 2 is a block diagram of an unmanned delivery device according to one example.

FIG. 2 illustrates a block diagram of the unmanned delivery device 115 according to one embodiment of the present disclosure. As shown, the unmanned delivery device 115 includes a network interface controller (NIC) 205, a computer 210, a transportation portion 215, and a secure portion 220. In certain embodiments, unmanned delivery device 115 may include additional components such as a biometric scanner as detailed above configured to obtain biometric identifiers from the customers.

In the illustrated example, the NIC 205 is configured to facilitate communication between the unmanned aerial vehicle 115 and the other system components, such as the control backend 110 and/or verification device 120, through the network 105. In accordance with some forms, computer 210 comprises memory storage 225. Memory storage 225 of the computer 210 may be configured to store working data on the unmanned delivery device 115. Such working data includes, but is not limited to, the public key generated from the processor 130 and/or the biometric identifiers of the customers. The transportation portion 215 is configured to move the unmanned delivery device 115 to the site of delivery. The structure of the transportation portion 215 can vary according to the particular unmanned delivery device 115 selected for use in the secure delivery system 100. The unmanned delivery devices 115 that are suitable for use in the secure delivery system 100 includes, but is not limited to, aerial drones, ground delivery drones or robots, autonomous vehicles, underwater drones, and/or hybrid systems that can switch between modes of transportation. Thus, with respect to these unmanned delivery devices 115, the transportation portion 215 may include, but is also not limited to, chassis, drivetrain, propulsion system, frame, and/or hull. The secure portion 220 is configured to securely store and protect products during transportation until authorized personnel, such as the ordering customer, obtains access to the secure portion 220. In one form, the transportation portion 215 is releasably coupled to the secure portion 220. In another form, the transportation portion 215 is integrated with the secure portion 220. In this way, secure portion 220 of the unmanned delivery device 115 maybe fixed or detachable from the transportation portion 220. In yet another form, the secure portion 220 may be extended to a lower position than the unmanned delivery device 115 relative to the ground. In certain embodiments, the NIC 205 and/or computer 210 are configured to be detachable from the transportation portion along with the secure portion 220. In this way, a detached secure portion is capable of maintaining network communication and processing data as disclosed herein.

Figure 3:
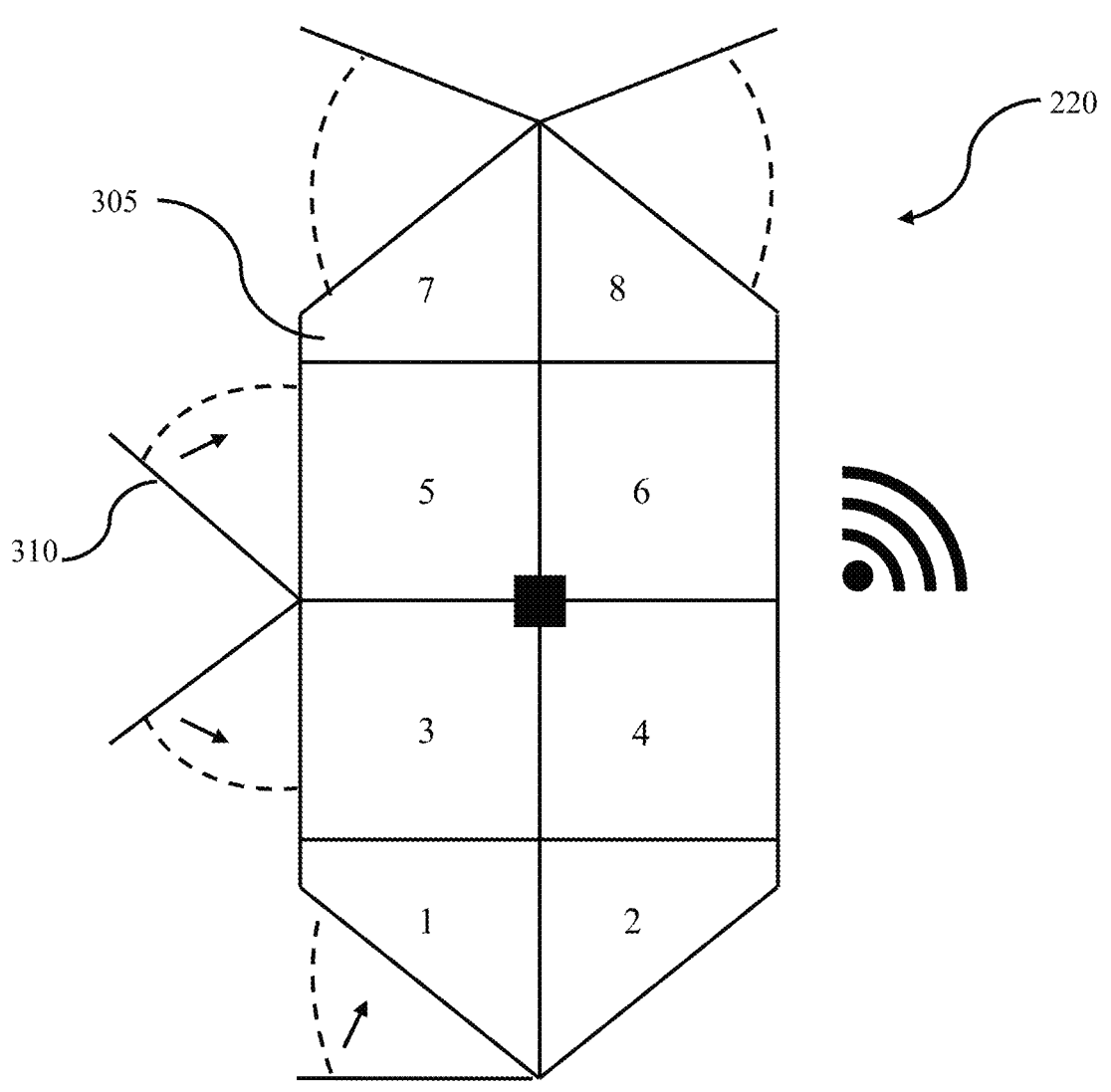
FIG. 3 is a top view of a secure portion according to one embodiment.

FIG. 3 illustrates a top view of one embodiment of a secure portion 220 of the unmanned delivery devices 115 of the present disclosure. As shown, the secure portion 220 includes eight secure compartments 305. Each of the secure compartments 305 includes a door 310. In certain embodiments, the secure portion 220 may include fewer and/or more secure compartments 305. For example, in certain embodiments the secure portion includes a single secure compartment. In some forms the secure portion includes 1 to 16 secure compartments. The doors 310 may include sliding doors, hinged doors, roll-up doors, and/or any suitable locking doors. In one example, the secure compartment 305 is climate-controlled to maintain environmental conditions that meet the specific requirements of the products intended to be located inside the secure compartment 305. For instance, both the secure compartment 305 and the door 310 may be constructed with insulation materials. Additionally, the secure compartment 305 and the door may be equipped with rubber gaskets and/or other sealant to prevent external air interference and moisture penetration. Thus devices of the present disclosure may be configured to maintain temperature and humidity levels inside the secure compartment 305 within a specified range for a specific duration of time. In some forms, the secure compartment 305 may include a small-scale refrigeration and/or heating unit for active temperature controls. In yet another example, the secure compartment 305 may include a humidity control system to maintain an optimal moisture level inside the secure compartment 305. Additionally, each of the secure compartments 305 may include a temperature and/or a moisture sensor.

In accordance with certain embodiments, the secure compartment 305 is further configured to be tamper-proof. In some forms, the secure compartment 305 is constructed from reinforced polymers, metals, and/or other composite materials that offer shock resistance, ballistic impact resistance, and can withstanding shear, tensile, and compressive stress. In some examples, the secure compartments 305 are built adhering to relevant standards, such as MIL-STD-810, the military standards for environmental engineering considerations and laboratory tests. The detailed procedures for testing the impact resistance of equipment under MIL-STD-810 are hereby incorporated by reference. In another form, the secure compartment 305 includes high-security locks, including, but is not limited to, biometric scanners, PIN codes, and/or RFID technology, ensuring that they the door 310 can only be opened by authorized personnel. In yet another form, the secure compartment 305 include a tamper sensor that is configured to trigger alarms on the unmanned delivery devices 115 and send real-time alerts to the control backend 110. The delivery device 115 and/or secure compartment 305 may further includes surveillance tools, such as security cameras, to monitor and record videos of the products inside, the secure portion 220 externally, and or the area surrounding the unmanned delivery device 115.

Figure 4:
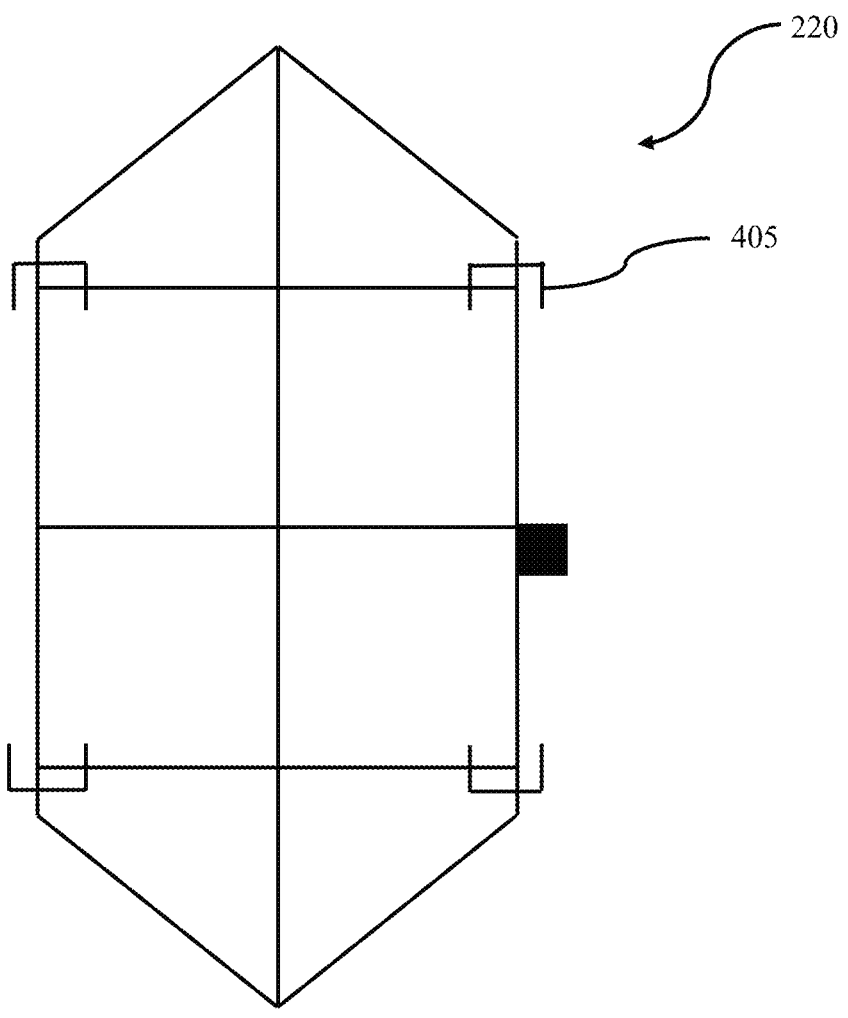
FIG. 4 is a top view of a secure portion according to a different embodiment.

FIG. 4 illustrates a top view of another example of the secure portion 220 as disclosed herein. As shown, the secure portion 220 includes a plurality of brackets 405. The brackets 405 are configured to facilitate the attachment and detachment of the secure portion 220 to and from another portion of the unmanned delivery device 115 as detailed above. It should be noted that in other examples, the secure portion 220 may be fixed to the unmanned delivery device 115. For example, a built-in secure portion 220 of the unmanned delivery device 115. Additionally and alternatively, the brackets 405 are configured to facilitate the attachment and detachment of additional secure compartments 305 onto the secure portion 220. This configuration allows for the modification of the number of the secure compartments 305 in the unmanned delivery device 115 as needed. As should be appreciated, the types of the secure compartments 305, such as those that are temperature controlled, humidity controlled, and/or waterproofed, can be combined within a single assembly of the secure portion 220 to meet the demands of a delivery trip.

Figure 5:
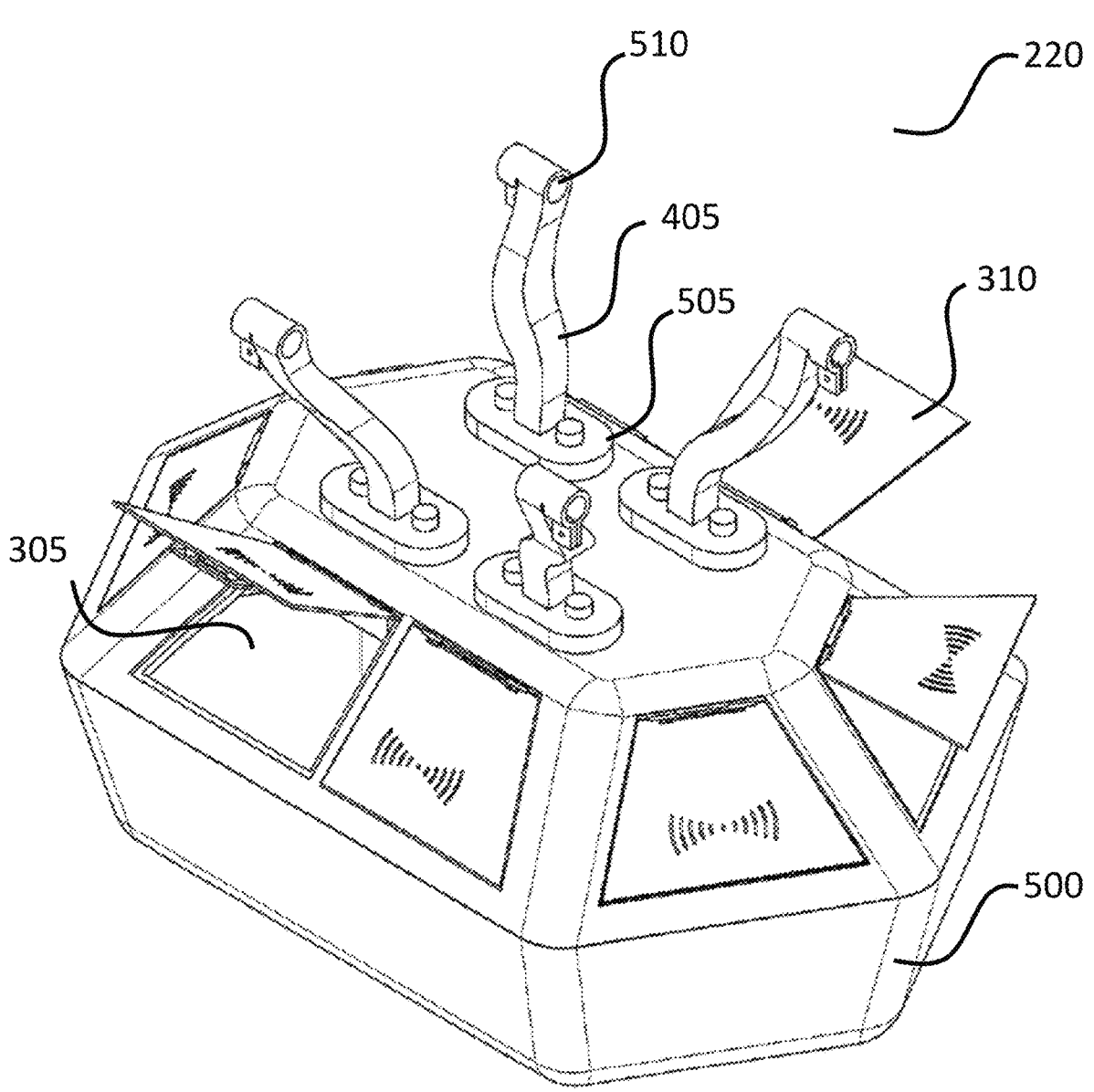
FIG. 5 is a profile view of a secure portion according to another embodiment.

FIG. 5 illustrates a profile view of one embodiment of the secure portion 220. As shown, the secure portion 220 includes a body portion 500. The body portion 500 may be constructed from any suitable material a that provides shock resistance and can withstanding shear, tensile, and/or compressive stress, for example a reinforced composite material. As should be appreciated, in other embodiments, the body portion may have different structures such as a two-part structure and can be made from other reinforced materials such as metal. As shown in the illustrated, the bracket 405 is coupled to the top surface of the body portion 500 and extends upward relative to the top surface of the body portion 500 to form a bracket connector 510. The bracket connector 510 is configured to be attached to another portion of the unmanned delivery device 115 as detailed above.

Continuing with the embodiment shown in FIG. 5, each of the secure compartments 305 includes a door 310. The door 310 includes a hinge that is operated by an automatic locking mechanism. In one version, the automatic locking mechanism is operated by an encrypted key system such as the public/private keys detailed herein. For example, when a private key matches the public key stored in and associated with the specific secure compartment 305, the automatic locking mechanism unlocks the door 310 to provide access to the secure compartment 305. In some formes, the door 310 is equipped with Near Field Communication (NFC) technology to facilitate the secure communication without requiring a secure element such as a microprocessor chip, increasing the flexibility and case of use of the secure delivery system 100. According to one example, the secure portion 220 further includes a biometric scanner. The biometric scanner is configured to scan and obtain biometric identifiers, such as facial identification, retina identification, and/or fingerprints of a user.

Figure 6:
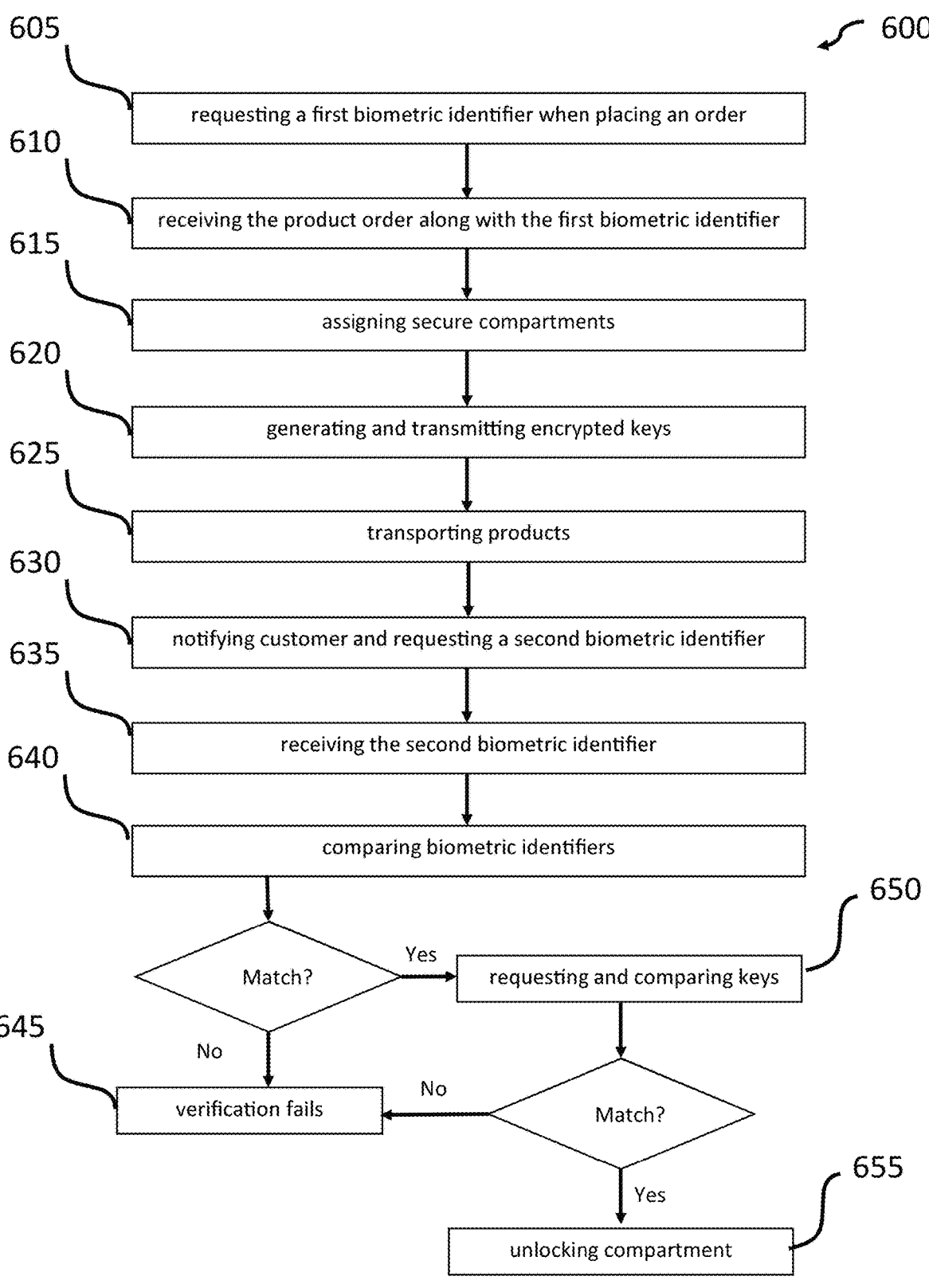
FIG. 6 is a chart illustrating a method of operating the secure delivery system according to one example.

A flowchart 600 illustrating one embodiment of the process of secure delivery using the secure delivery system 100 is shown in FIG. 6. Generally, the process starts when a customer places an order. In certain embodiments, the order comprises a controlled or valuable item, The order may be placed using an app on the verification device 120 described herein. In stage 605, the customer provides a first biometric identifier. In accordance with some forms, the first biometric identifier is transmitted to the database 125 of the control backend 110, or other secure database, before the order can be processed. In stage 610, the product order information is received by database 125. In certain embodiments, product order information includes at least the products to be delivered and a delivery location designated by the customer. In accordance with some forms, the product order information includes the first biometric identifier of the customer. In some forms, a first reference identifier is linked to the first biometric identifier. The first reference identifier may be used to confirm the first biometric identifier without requiring storage of the first biometric identifier on database 125. In some forms, the biometric identifier(s) is (are) stored on a separate secure database. As should be appreciated, the delivery location may be in the form an address input by the customer and/or GPS coordinates automatically obtained from the customer's verification device 120 and/or manually modified by the customer. In certain embodiments, the customer may provide status verification materials such as prescription information, age verification, and/or other legal status identifiers. Such status verification materials may be stored by the database 125, or a separate secure database, such that confirmation is or is not required to be provided with subsequent orders. In this way, the customer may be prohibited from ordering certain age restricted materials (e.g. tobacco, *cannabis*, and/or alcohol), or prescription medications without a valid prescription.

Generally, the processor 130 of the control backend 110 processes the customer orders. In stage 615, the processor 130 assigns at least one secure compartment 305 of the unmanned delivery device 115 to the ordered product. In stage 620, the processor 130 generates encrypted keys, which includes a public key stored on the unmanned delivery device 115 and associated with the secure compartments 305 assigned to the product, and a private key stored in the database 125 at the control backend 110 and sent to the customer's verification device 120. It should be noted that the ordered products can be loaded into the secure compartments 305 at any time after the at least one secure compartment 305 has been assigned and before the unmanned delivery device is launched.

In stage 625, the unmanned delivery device 115 is launched from a distribution center and navigates to the delivery location. In some forms, the delivery device navigates autonomously, using GPS and/or real-time traffic data to optimize the route, carrying the secure compartments 305 with the ordered products secured therein to the delivery location. As aforementioned, unmanned delivery device 115 may be an aerial drone, a ground delivery robot, an autonomous vehicle, an underwater drone, and/or a hybrid system that can switch between modes of transportation.

According to one embodiment, the unmanned delivery device 115 lowers the secured portion 220 to a height that is less than six feet above the ground while hovering in the air. In certain embodiments the unmanned delivery device 115 lands at a designated location. According to another embodiment, the unmanned delivery device 115 stops on the ground. In certain embodiments, around the time of arrival, in stage 630, the customer receives a notification that the order is ready for pickup and a request of a second biometric identification. In one form, the notification is sent to customer's verification device 120 from the unmanned delivery device 115. As should be appreciated, the notification may be sent via emails, popup messages, and/or text messages and/or sent from the control backend 110.

When the customer is ready for picking up the ordered products, the customer approaches the unmanned delivery device 115 and completes a second biometric scan. According to one example, the second biometric scan is taken by the verification device 120 via a biometric scan integrated thereon. For instance, the verification device 120 may be a smart phone and/or smart watch with a facial recognition scanner and/or a fingerprint receiver. According to other examples, the second biometric scan is taken by the unmanned delivery device 115 and/or the secure portion 220 that is equipped with a biometric scanner, such as a facial, retina, and/or fingerprint scanner. In one version, in stage 635, the second biometric identifier of the customer is transmitted to and received by the database 125 at the control backend 110. In another embodiment the second biometric identifier is linked to a second reference identifier. The second reference identifier may be used to confirm the second biometric identifier without requiring storage of the second biometric identifier on database 125. In accordance with some embodiments, in stage 640, the processor 130 analyzes the two biometric identifiers of the same customer stored in the database 125 to compare whether the second biometric identifier matches the first biometric identifier. In another version, in stage 635, the second biometric identifier of the customer is received by the unmanned delivery device 115. In this version, in stage 640, the computer 210 analyzes the second biometric identifier with the first biometric identifiers of the customer retrieved from the database 125 of the control backend 110, or using the first reference identifier, to compare whether the second biometric identifier matches the first biometric identifier.

In accordance with some forms, if the biometrics do not match, the verification fails in stage 645. According to on example, the unmanned delivery device 115 then returns to the original launching location or another predetermined location. Any attempted tampering may trigger alarms on the unmanned delivery devices 115 and send real-time alerts to the control backend 110. However, if the biometric identifiers match, the unmanned delivery device 115 requests the private key from the customer in stage 650. According to one embodiment, the customer transmits the private key via the verification device 120 using Near Field Communication (NFC) to the unmanned delivery device 115. In accordance with some examples, the doors 310 of the secure compartments 305 are equipped with NFC readers. The computer 210 of the unmanned delivery device 115 compares the private key it receives with the public key stored and associated with the secure compartment 305. In certain embodiments, the customer transmits the private key via the verification device 120 directly to the database 125 of the control backend 110 via a secure network 105. The processor 130 compares the private key it receives with the public key assigned to the secure compartment 305. As should be appreciated, other secure data transmitting method may be used for transmitting the private key. Again, if the private key does not match the public key, the verification fails in stage 645, and the unmanned delivery device 115 then returns to the original launching location or another location. Any attempted tampering with a locked compartment may trigger alarms on the unmanned delivery devices 115 and send real-time alerts to the control backend 110. However, if the private key matches the public key, in stage 655, the door 310 of the associated secure compartment 305 unlocks.

It is intended that the foregoing detailed description be regarded as illustrative rather than limiting, and that it be understood that it is the following claims, including all equivalents, that are intended to define the spirit and scope of this disclosure. All publications and patent applications cited in this specification are herein incorporated by reference as if each individual publication or patent application were specifically and individually indicated to be incorporated by reference. Further, any theory, mechanism of operation, proof, or finding stated herein is meant to further enhance understanding of the present disclosure, and is not intended to limit the present disclosure in any way to such theory, mechanism of operation, proof, or finding. While the disclosure has been illustrated and described in detail in the drawings and foregoing description, the same is to be considered as illustrative and not restrictive in character, it being understood that only selected embodiments have been shown and described and that all equivalents, changes, and modifications that come within the spirit of the disclosures as defined herein or by the following claims are desired to be protected.

GLOSSARY OF TERMS

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Artificial intelligence" or "AI" generally refers to the ability of machines to perceive, synthesize, and/or infer information. AI may enable a machine to perform tasks which normally require human intelligence. For example, AI may be configured for speech recognition, visual perception, decision making, language interpretation, logical reasoning, and/or moving objects. Typically, AI is embodied as a model of one or more systems that are relevant to tasks that a machine is configured to perform. AI models may be implemented on a device, such as a mechanical machine, an electrical circuit, and/or a computer. AI models may be implemented in an analog or digital form and may be implemented on hardware or software. The implementation of AI may also utilize multiple devices which may be connected in a network.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Backend" or "control backend" in the context of the secure delivery system generally refers to the system's processing center where data processing and operation management occur. A backend is crucial for supporting the frontend or user-facing part of the system, such as the unmanned delivery device and the verification device. Typically, the backend communicates with other system components through a network.

"Bracket" generally refers to a flat or curved component that forms part of another object. Typically, but not always, the bracket has a generally flat shape.

"Network" or "Computer Network" generally refers to a telecommunications system that allows computers or other electronic devices to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices." Two nodes can be considered "networked together" when one device is able to exchange information with another device, whether or not they have a direct connection to each other. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Network Interface Controller (NIC)" generally refers to a hardware component that enables a computer or other device to connect to a network. It acts as the interface between the computer and the network infrastructure, allowing the device to communicate with other devices on the same network or across different networks.

"Database", "Knowledge Base", "Data Store," or "Data Repository" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS. Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others. Examples of commercially available database management systems include PostgreSQL provided by the PostgreSQL Global Development Group; Microsoft SQL Server provided by the Microsoft Corporation of Redmond, Washington, USA; MySQL and various versions of the Oracle DBMS, often referred to as simply "Oracle" both separately offered by the Oracle Corporation of Redwood City, California, USA; the DBMS generally referred to as "SAP" provided by SAP SE of Walldorf, Germany; and the DB2 DBMS provided by the International Business Machines Corporation (IBM) of Armonk, New York, USA. The database and the DBMS software may also be referred to collectively as a "database". Similarly, the term "database" may also collectively refer to the database, the corresponding DBMS software, and a physical computer or collection of computers. Thus, the term "database" may refer to the data, software for managing the data, and/or a physical computer that includes some or all of the data and/or the software for managing the data.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g., "true" or "false"). Processing activities may occur in multiple single processors on separate servers, on multiple processors in a single server with separate processors, or on multiple processors physically remote from one another in separate computing devices.

"Aerial drones," or "unmanned aerial vehicles (UAVs)," generally refer to aircraft systems without human pilots on board. "Aerial drones" can be remotely controlled or fly autonomously through software-controlled flight plans in their embedded systems working in conjunction with onboard sensors and GPS. "Aerial drones" are commonly used for photography, surveillance, and/or delivery services where they can quickly transport goods over varied terrain without the need for roads.

"Ground delivery robots" generally refer to autonomous robots configured to deliver packages on the ground. "Ground delivery robots" typically navigate using cameras, sensors, and GPS to travel on sidewalks and through pedestrian areas or along the roads. These robots are equipped with compartments to carry goods and use various forms of secure access systems to ensure that only the intended recipient can retrieve the contents.

"Autonomous vehicles," or "self-driving cars," generally refer to vehicles capable of sensing their environment and moving safely with little or no human input. "Autonomous vehicles" combine a variety of sensors to perceive their surroundings, such as radar, lidar, sonar, GPS, odometry, and inertial measurement units. "Autonomous vehicles" are primarily used for passenger and freight transportation and are being developed to reduce human driver errors and increase transportation efficiency.

"Underwater drones," or "unmanned underwater vehicles (UUVs)," is generally used to explore and operate in underwater environments. "Underwater drones" are typically used for oceanography, underwater infrastructure inspections, search and recovery operations, military operations, as well as delivery purposes. These drones can be remotely operated or move autonomously and are equipped with cameras and other sensors to gather data from the underwater environment.

"Hybrid systems" generally refer to systems capable of operating in more than one mode of transportation. "Hybrid systems" can switch between flying and driving, for example, allowing them to navigate various environments efficiently. Such systems are particularly useful in complex logistical scenarios where a single mode of transport might not be sufficient due to terrain challenges or varying operational requirements. "Hybrid systems" combine the technology of aerial drones and ground vehicles to provide versatile solutions in unmanned delivery and transportation.

"NFC," or "Near Field Communication," generally refer to a form of wireless data transfer that allows devices to share information at a close range with a simple tap or close proximity (usually within a few centimeters). NFC operates at 13.56 MHz and typically enables communication between two devices over a short distance. In NFC technology, Host-based Card Emulation (HCE) allows an NFC device to perform card emulation on an NFC-enabled device without relying on a secure element. For secure transactions, HCE often works with cloud-based security measures to protect data. Additionally, NFC Data Exchange Format (NDEF) typically refers to a standardized data format that can be used to exchange information between any compatible NFC devices. For secure transmission, the data within NDEF messages can be encrypted.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

It should be noted that the singular forms "a," "an," "the," and the like as used in the description and/or the claims include the plural forms unless expressly discussed otherwise. For example, if the specification and/or claims refer to "a device" or "the device," it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the disclosure has been illustrated and described in detail in the drawings and foregoing description, the same is to be considered as illustrative and not restrictive in character, it being understood that only the preferred embodiment has been shown and described and that all changes, equivalents, and modifications that come within the spirit of the disclosures defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method for secure delivery of a parcel by way of an unmanned delivery device having one or more secure compartments, the method comprising:

receiving a first biometric identifier of a customer at a database configured to store customer biometric identification and verify customer identity;

receiving a product order from the customer, the product order designating items to be delivered and a delivery location;

assigning at least one secure compartment of the unmanned delivery device for items of the product order;

generating a public key and a private key, wherein the public key is stored on the unmanned delivery device and is associated with the assigned at least one secure compartment assigned to the product order, and wherein the private key is stored in the database and is transmitted to a verification device of the customer;

transporting, by the unmanned delivery device, the secure compartment, having items of the product order secured therein, to the delivery location;

receiving a second biometric identifier of the customer by the unmanned delivery device;

transmitting the second biometric identifier to the database to verify whether the second biometric identifier matches the first biometric identifier;

requesting, by the unmanned delivery device, the private key from the verification device of the customer upon verification that the second biometric identifier matches the first biometric identifier;

determining whether the private key from the verification device of the customer matches the public key associated with the at least one secure compartment;

in response to the private key from the verification device of the customer and the public key associated with the at least one compartment of the safe matching, providing access to the at least one secure compartment assigned to the product order.

2. The method for secure delivery of a parcel by way of an unmanned delivery device having one or more secure compartments of claim 1, wherein the verification device includes an NFC device.

3. The method for secure delivery of a parcel by way of an unmanned delivery device having one or more secure compartments of claim 2, wherein the NFC device includes one or more of the following: a cell phone, a computer, a tablet, and/or a smart wearable device.

4. The method for secure delivery of a parcel by way of an unmanned delivery device having one or more secure compartments of claim 2, wherein the NFC device is configured to perform card emulation without relying on a secure element.

5. The method for secure delivery of a parcel by way of an unmanned delivery device having one or more secure compartments of claim 1, wherein the unmanned delivery device includes an aerial drone.

6. The method for secure delivery of a parcel by way of an unmanned delivery device having one or more secure compartments of claim 5, further comprising landing the aerial drone at the delivery location.

7. The method for secure delivery of a parcel by way of an unmanned delivery device having one or more secure compartments of claim 1, wherein the first biometric identifier and the second biometric identifier include one or more of the following: facial recognition, fingerprint identification, and/or retinal identification.

8. The method of claim 1, wherein the unmanned delivery device comprises an autonomous ground transportation device.

9. The method of claim 1, wherein the at least one secure compartment is configured to be sealed to prevent penetration of ambience air and moisture.

10. The method of claim 1, wherein the unmanned delivery device includes a processor, a computer, and a data transceiver, and wherein the data transceiver is configured to receive data from and transmit data to at least one outside device in a wireless manner.

11. The method of claim 1 wherein the at least one secure compartment is configured to deter physical tampering.

* * * * *